US011437810B2

(12) United States Patent
Odenberg et al.

(10) Patent No.: US 11,437,810 B2
(45) Date of Patent: Sep. 6, 2022

(54) SYSTEMS AND METHODS TO SUPPRESS AC TRANSIENT VOLTAGE AND FOR AC POWERLINE POLARITY REVERSAL DETECTION AND ALARM

(71) Applicants: Richard Odenberg, Spokane, WA (US); John Haynes, Spokane, WA (US)

(72) Inventors: Richard Odenberg, Spokane, WA (US); John Haynes, Spokane, WA (US)

( * ) Notice: Subject to any disclaimer, the term of this patent is extended or adjusted under 35 U.S.C. 154(b) by 457 days.

(21) Appl. No.: 16/296,173

(22) Filed: Mar. 7, 2019

(65) Prior Publication Data

US 2019/0273377 A1    Sep. 5, 2019

(51) Int. Cl.
*H02H 9/00* (2006.01)
*H02H 9/04* (2006.01)

(52) U.S. Cl.
CPC ............ *H02H 9/005* (2013.01); *H02H 9/042* (2013.01)

(58) Field of Classification Search
CPC .............................. H02H 9/005; H02H 9/042
See application file for complete search history.

(56) References Cited

U.S. PATENT DOCUMENTS

| 10,182,484 | B1* | 1/2019 | Thornton | H05B 45/50 |
|---|---|---|---|---|
| 2012/0206100 | A1* | 8/2012 | Brown | B60L 3/0069 320/109 |
| 2014/0236319 | A1* | 8/2014 | Richetta | H02H 5/04 700/80 |
| 2014/0262481 | A1* | 9/2014 | Khoury | H05K 9/0037 174/480 |
| 2016/0301203 | A1* | 10/2016 | Curry | H02H 9/046 |
| 2017/0063566 | A1* | 3/2017 | Seminario | H04L 63/029 |
| 2018/0358804 | A1* | 12/2018 | Pelegris | G08B 21/185 |

* cited by examiner

*Primary Examiner* — Scott Bauer
(74) *Attorney, Agent, or Firm* — Lee & Hayes, P.C.

(57) ABSTRACT

A transient voltage suppressor ("TVS") device includes a housing. Three prongs extend from the first end and are adapted for electrically connecting to an alternating current power source receptacle. Three recessed contacts extend into the second end of the housing for receiving three prongs from a power connector. The three prongs and three recessed contacts are adapted to pass electrical power along a ground wire, a neutral wire, and line wire, respectively. A protection circuit includes at least one silicon avalanche suppression diode ("SAS diode") to limit high transient voltage imposed thereon to a lower level. A notification circuit is configured to communicate a status of the TVS device and configured to notify a user of one or more of: a correct connection of the vehicle wiring with respect to the power source, an incorrect connection of the vehicle wiring with respect to the power source, or a fault.

18 Claims, 8 Drawing Sheets

SYSTEMS AND METHODS TO SUPPRESS AC TRANSIENT VOLTAGE AND FOR AC POWERLINE POLARITY REVERSAL DETECTION AND ALARM

BACKGROUND

Presently, electrical protection systems that protect vehicles, for example, boats, when connected to a power source, may monitor power to detect and possibly protect against some undesired voltage changes and wire line response. Those systems are limited to availability at limited power sources, for example, not all docks provide an electrical protection system. Moreover, if one is provided, the electrical protection system often provides protection for a limited range of voltages, durations, and power levels. As such, in the event the change in voltage exceeds the range for which the electrical protection system was designed, such a system still allows damage to components connected to the power source. Power line wire reversals occur time to time, which can cause electrocution when the power is grounded into the water, for example, from a boat.

BRIEF DESCRIPTION OF THE DRAWINGS

The Detailed Description is set forth with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
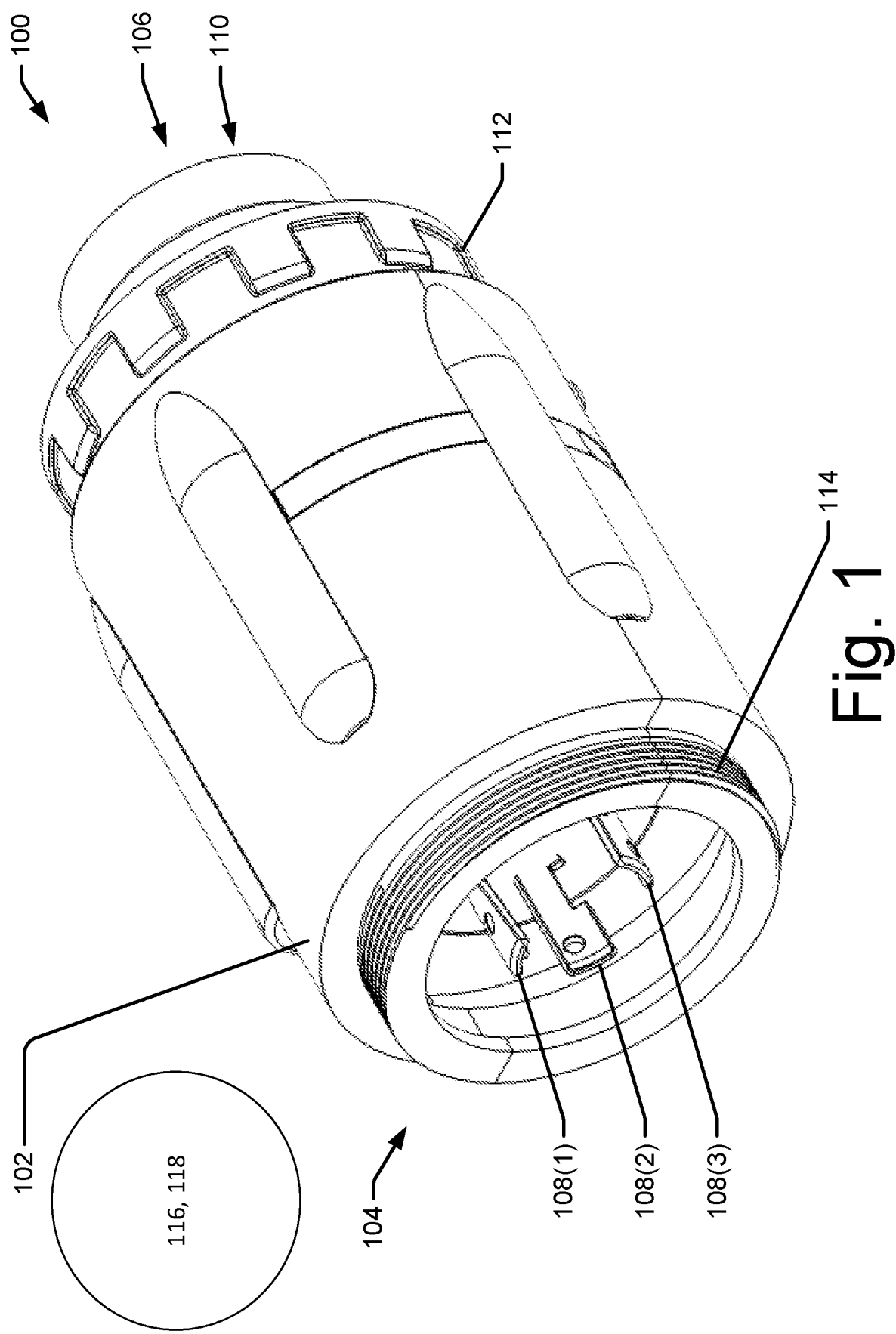
FIG. 1 shows a perspective view of a transient voltage suppressor (TVS) device according to an embodiment of the instant disclosure.

Presently electrical systems may be affected by transient over-voltages. An example of a transient over-voltage may be a high-voltage transient with a short risetime, such as one to ten microseconds (1-10 µs), with a decay lasting hundreds of microseconds. However, other ranges of transient over-voltages may be expected. There are many possible sources and causes of transient over-voltages. For example, when lightning strikes a power line, a majority of the energy released in the lightning strike may be conducted to ground through various protection devices, however, a high-voltage transient may still be created and transmitted in the power system. Additionally, and/or alternatively, switching operations in a power system may result in high-voltage transients. For example, switching capacitor banks may cause a high-voltage transient when engaged, line and cable switching may cause a high-voltage transient when the circuit is reenergized, as well as motor or load switching on the system. One problem that arises with the occurrence of a high-voltage transient is that high-voltage transients may cause damage to sensitive electronic equipment that is plugged into power outlets downstream at the user level.

Presently, more and more industries and settings are adversely affected by high-voltage transients than in the past. For example, with the increased availability and use of electronics in consumer and commercial settings, there is an increased demand for power as well as protection. One of the industries currently affected is the vehicle industry. For example, recreational vehicles (RV), electric cars, boats, aircraft, etc., carry sensitive electronic equipment including, but not limited to, entertainment devices, navigation devices, communication devices, etc. Additionally, these vehicles often are connected to a power source, for example, an electrical grid, to charge or recharge the vehicle or operate some or all of the devices. Further, even if a device is not constantly operated, the device often remains connected to the vehicle's power system while the vehicle is connected to the power source. These situations put these devices at risk of damage from high-voltage transients.

Disclosed herein are various embodiments of a transient voltage suppressor device (TVS device) combined with a Ground Fault Detector (GFD) and alarm system that provide protection to a vehicle and connected devices from high-voltage transient events. Note, for the sake of brevity, the terms "TVS device" or "TVS," as used herein throughout, are intended to mean a TVS device with a GFD and alarm system, unless explicitly stated otherwise. For example, in an embodiment, a TVS device according to the instant disclosure uses a Silicon Avalanche Suppressor device (SAS device) to limit the transient voltage of the power system and a GFD and alarm system to simultaneously detect and alarm a user of the occurrence of AC powerline reversal. That is, the high-voltage transient enters the vehicle and the TVS device limits the high-voltage transient back to the power system or to ground.

A vehicle, such as a boat, may have a power source ("local power source") or device ("local switching load") on board that may generate a high-voltage transient event. A TVS device according to the instant disclosure may protect the vehicle or devices connected thereto from the locally created high-voltage transient event. For example, the connection of a boat to an external power source, such as shore power, the disconnection of a boat from an external power source, such as shore power, and switching to a local power source, the local power source experiencing a fault, or the boat being affected by a lightning strike, may cause the boat and any connected devices to experience a high-voltage transient. In such a situation, even though a vehicle is disconnected from an external power source, when the vehicle is equipped with a TVS device according to the instant disclosure, the TVS device may still suppress the transient voltage.

Moreover, in the event the TVS device is triggered, in an embodiment, the TVS device may include a circuit configured to provide remote status monitoring. The circuit may send and/or receive one or more signals to, or from, a location remote from the TVS device, such as a landline phone, a cell phone, a cloud database, a network database, a monitoring device, a sensing device, or other device having corresponding communication capabilities, wirelessly or wired, to receive or retrieve status information from the TVS device.

Illustrative Embodiment

FIG. 1 shows an illustrative transient voltage suppressor (TVS) 100. The TVS 100 may include a rigid housing 102, for example, the rigid housing 102 may include a first end 104 and an opposing second end 106. Notably, and particularly in the case where the vehicle (see 402 in FIG. 4) for which the TVS is used is a boat, the housing 102 is waterproof. In an embodiment, the first end 104 may include prongs 108(1), 108(2), 108(3) extending from the first end 104 adapted for electrically connecting to a power source (see 404 in FIG. 4), for example an alternating current power source. Alternatively, other configurations may include one, two, four, or more prongs. The configuration may be driven as desirable or required by the power source, power source connector, receptacle, or combinations thereof. For example, in an embodiment the power source may include an alternating power source with a line wire and a neutral wire with a voltage potential between the two. Additionally, and/or alternatively, the power source may be further configured to provide a ground wire. Additionally, and/or alternatively, the power source may be further configured to provide a second line wire that may provide a second voltage potential between the first line wire, the neutral wire, or combinations thereof.

In an embodiment, the opposing second end 106 may include three recessed contacts 110 for receiving prongs from a power connector. Alternatively, other configurations may include one, two, four or more contacts as desirable or required by the power connector. For example, the power connector may be coupled to a vehicle where the vehicle is configured to receive power through the power connector from an outside source. Here, the prongs 108 may be adapted to pass electrical power through the TVS 100 to a respective recessed contact in the second end 106. In general, different prong configurations (connectors) may be implemented for different voltages and standards around the world.

Additionally, in an embodiment, TVS 100 may further include a locking ring 112 to removably attach TVS 100 to a power connector. In an embodiment, locking ring 112 may have an internal threaded surface that may engage a complementary threaded surface on the power connector where the internal threaded surface and complementary threaded surface securely engage each other to cause one or more prongs of the power connector to securely engage a respective recessed contact of the TVS 100. Furthermore, threaded surfaces may directly or indirectly create or facilitate a watertight seal between the second end 106 and/or the rigid housing 102 and the power connector.

Additionally, in an embodiment the first end 104 may have a locking surface 114 that may removably attach the TVS 100 to a power supply. For example, in an embodiment locking surface 114 may have a threaded surface that may engage a complementary threaded surface on the power supply where the threaded surface and complementary threaded surface securely engage each other to cause one or more prongs of the TVS 100 to securely engage a respective recessed contact of the power source. Additionally, and/or alternatively, in an embodiment the threaded surfaces may directly or indirectly create or facilitate a watertight seal between the first end 104 and/or the rigid housing 102 and the power source. Here, the power source may be directly connected to the TVS 100, through a coupling, through a power cord, or other connection technique.

Notably, the TVS 100 may include end caps 116, 118 to minimize entry of water or moisture when not connected on both ends.

Figure 2:
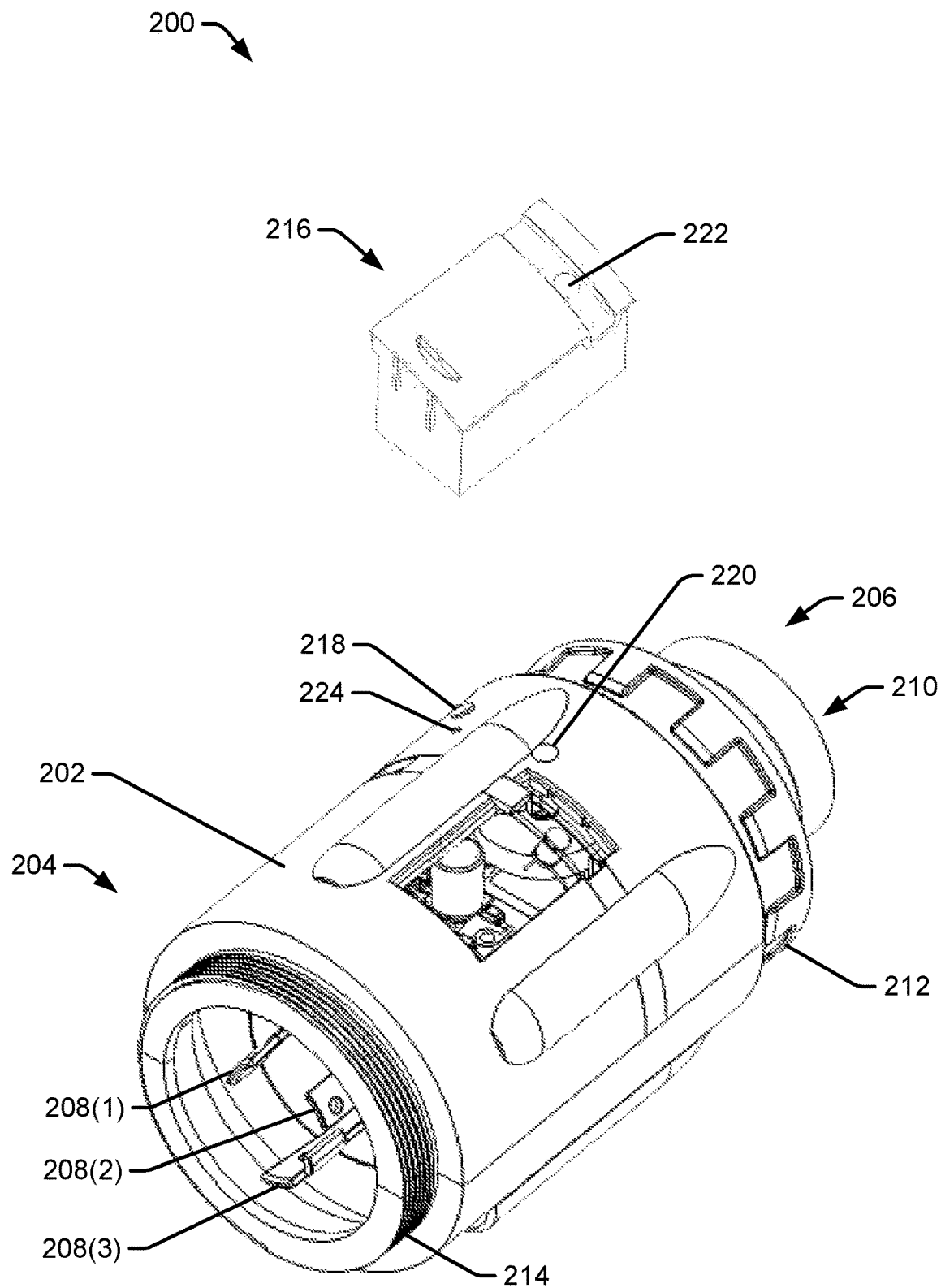
FIG. 2 shows a perspective view of a TVS device with a removable section according to an embodiment of the instant disclosure.

FIG. 2 shows an illustrative TVS 200. The TVS 200 may be similar to TVS 100 shown in FIG. 1. For example, TVS 200 may include a rigid housing 202, a first end 204 and an opposing second end 206. In various embodiments the first end 204 may include three prongs 208(1), 208(2), 208(3), and the opposing second end 206 may include three recessed contacts 210 configured to pass electrical power between a prong 108 to a respective recessed contact 210. Additionally, TVS 200 may further include a locking ring 212 to removably attach TVS 200 to a power connector. Additionally, in an embodiment the first end 204 may have a locking surface 214 that may removably attach the TVS 200 to a power supply.

FIG. 2 also shows a removable portion 216 of a protection circuit removed from the rigid housing 202 and electrically disengaged from the protection circuit housed within the rigid housing 202. In an embodiment, the removable portion 216 may include one or more replaceable components of the protection circuit. Additionally, and/or alternatively, the removable portion 216 may be removed from TVS 200 and replaced entirely by a different removable portion not shown.

Additionally, TVS 200 may include visual indicators 218, 220, 222 that may communicate a status of the TVS 200, the power supply, and/or a vehicle coupled to the power connector. Furthermore, TVS 200 may include a switch access 224 to adjust a visual indicator (e.g., one or more LED lights), an audible indicator (e.g., an alarm reaching up to 60 dB or more, which, in an embodiment, must be reset manually to turn off), or combinations thereof. Additionally, removable portion 216 may engagingly lock with housing 202.

Figure 3:
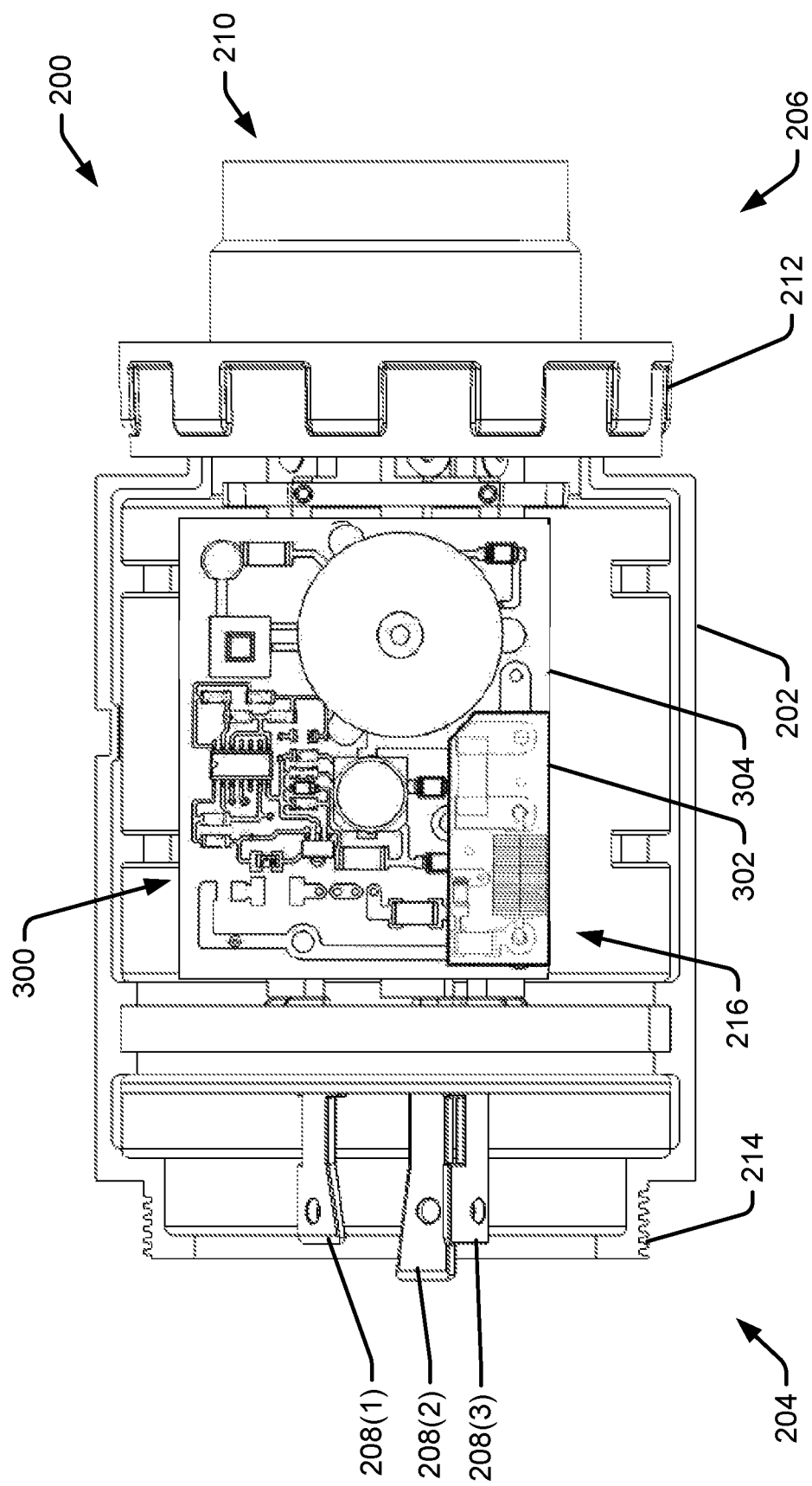
FIG. 3 shows a side view of the TVS device of FIG. 2 with a portion of the housing cutaway to expose internal features of the TVS device according to an embodiment of the instant disclosure.
Figure 4:
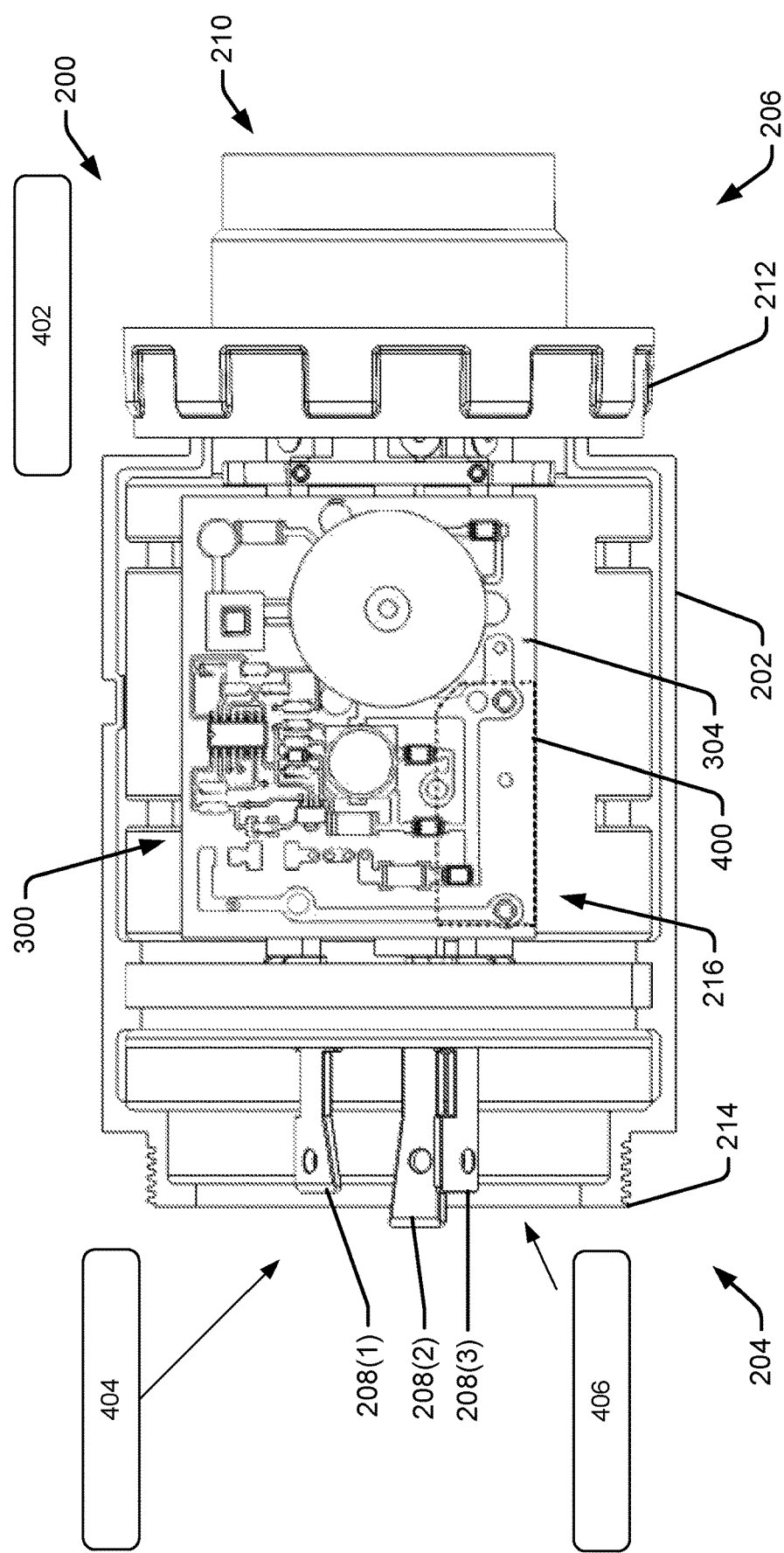
FIG. 4 shows another side view of the TVS device of FIG. 3 with an internal feature of the TVS device further removed for clarity according to an embodiment of the instant disclosure.

FIGS. 3 and 4 show views of TVS 200 with portions of the rigid housing 202 cutaway. For example, FIG. 3 shows a portion of circuitry 300 with a suppression board 302 including SAS(s) 302(A), electrically coupled to a circuit board 304. Circuitry 300 may include protection circuit components including the SAS(s) 302A, configured to provide the protective features discussed herein. Circuitry 300 may further include communication components configured to provide remote status monitoring. The communication components may send and/or receive one or more signals to, or from, a remote secondary device 406 at a location remote from TVS 200, such as a landline phone, a cell phone, a cloud database, a network database, a monitoring device, a sensing device, or other device having corresponding communication capabilities, wirelessly or wired, to receive or retrieve status information from TVS 200.

Additionally, TVS 200 may be installed or implemented on or in a multi-point system, such as a marina where multiple vessels may be kept and connected. In such a multi-point system, a plurality of TVS devices, respectively, associated with distinct physical locations and vessels within the marina may be linked electronically, and each one assigned a unique identifier that indicates the location, the device, and associated vessel. In the event of a failure or other need to inspect or service a TVS device or a connected vessel in a multi-point system, the communication (or signal sent or received) of the status of the respective TVS devices includes the unique identifier, and thereby provides a way for a service request to be directed to the one or more specific TVS devices that were triggered.

The communication components of circuitry 300 may further include a TVS failure alarm with support Modbus TCP and Modbus RTU over TCP for remote network monitoring, such as a cloud service or similar communication support types. Additionally, and/or alternatively, the communication components may contain Internet of Things (IoT) sensors to sense an electrical change then signal a Modbus or other sender unit to send a message or signal to a remote receiver.

In an embodiment, removable portion 216 includes the suppression circuit board 302 such that when removable portion 216 is disengaged from the TVS 200, the suppression circuit board 302 is disengaged from the circuit board 304 and removed from the TVS 200.

FIG. 4 shows the suppression circuit board 302 disengaged from the circuit board 304 and removed from the TVS 200 where the dotted line 400 shows an illustrative outline of the removed suppression circuit board's footprint.

Figure 5A:
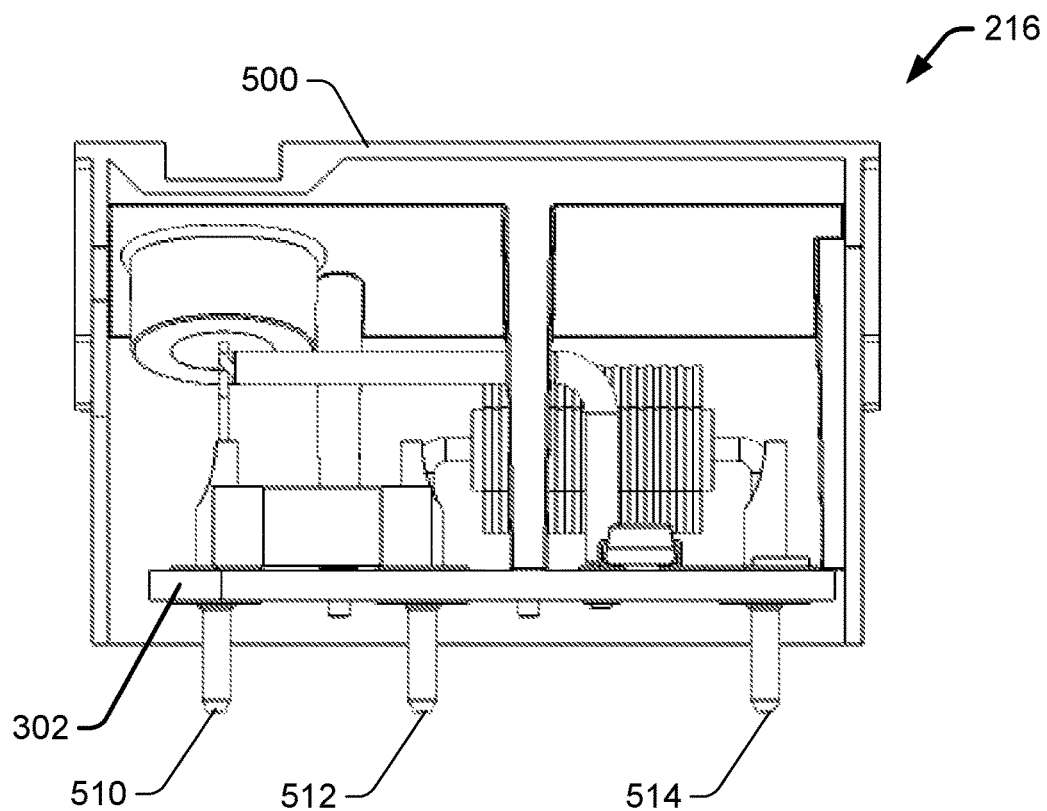
FIG. 5A shows a side view of an illustrative removable portion according to an embodiment of the instant disclosure.

FIGS. 5A and B show a side and perspective view respectively of removable portion 216. For example, removable portion 216 may include housing 500. In an embodiment, housing 500 may provide support for suppression board 302 and/or visual indicator 222.

Figure 5B:
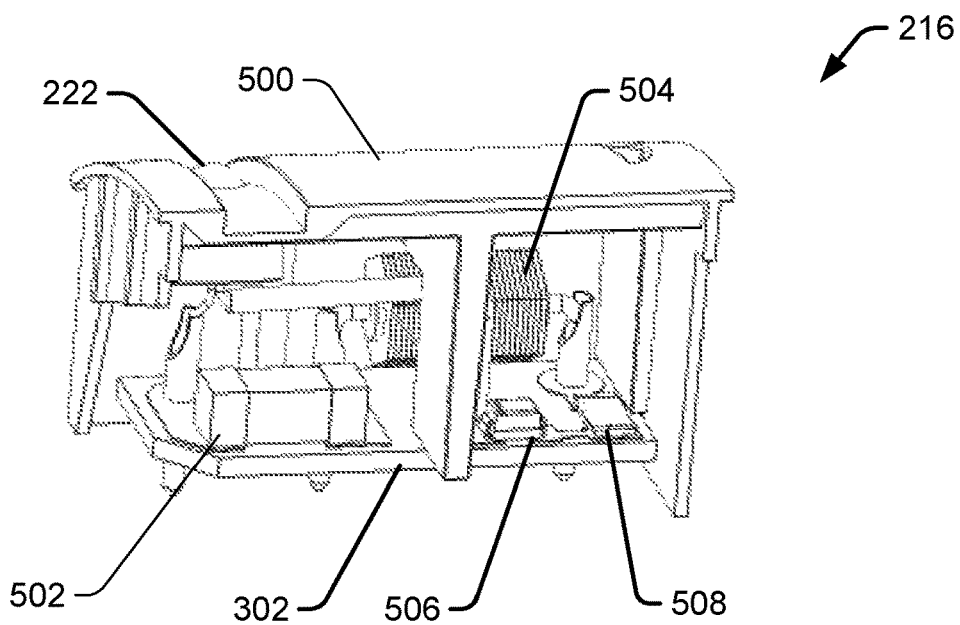
FIG. 5B shows a perspective view of the removable portion shown in FIG. 5A, according to an embodiment of the instant disclosure.

FIG. 5B also shows a perspective view of an illustrative embodiment of the suppression board 302 including a fuse 502, one or more Silicon Avalanche Suppressor diode(s) 504 (i.e., when more than one is used, the SASs may be stacked, as shown, for example), a rectifier diode 506, and a resistor 508.

FIG. 5A also shows pins 510, 512, 514 configured to electrically connect suppression board 302 to protection circuit board 304. Removable portion 216 may include locking features (not shown) (e.g., detent/indent, snap fit, etc.) in housing 500 to connect to TVS 200 to retain portion 216 in place. A seal (not shown) may be included on perimeter of portion 216 to abut housing 500 against housing 202 for water tightness.

Figure 6:
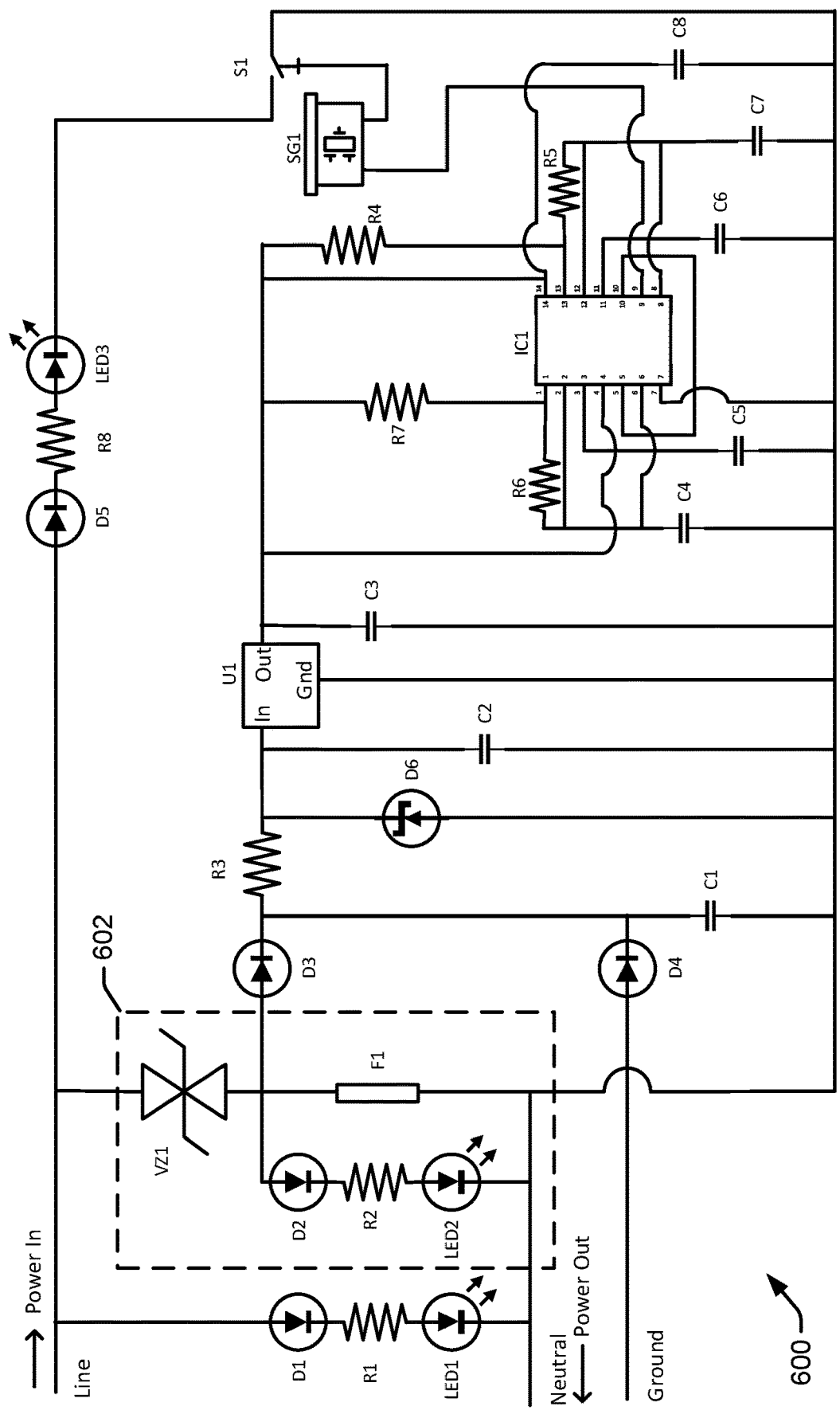
FIG. 6 is a schematic drawing representing the protection circuit depicted in FIGS. 2, 3, 4, 5A, and 5B according to an embodiment of a TVS device of the instant disclosure.

FIG. 6 is a schematic drawing representing an illustrative protection circuit 600. For example, protection circuit 600 may include a connection to a hot or a line (Line) that may carry voltage, for example, from a power source, a neutral (Neutral) that may return voltage to a power source, and a ground (Ground). Here, an indicating circuit may be connected between the Hot and Neutral and configured to indicate that the protection circuit 600 is connected to a power source. For example, the indicating circuit may include a rectifier diode D1, a resistor R1 and a light emitting diode (LED) LED1.

In an embodiment, a suppression circuit 602 may be connected between the Line and Neutral and configured to limit a high-voltage transient to a lower voltage to protect sensitive devices downstream from the protection circuit 600. Here, the suppression circuit 602 may include a Silicon Avalanche Suppressor (SAS) VZ1 connected to the Line with a fuse F1 and an indication circuit in parallel between VZ1 and the Neutral. The indication circuit may include a rectifier diode D2, a resistor R2, and an LED LED2. Here, the SAS may include one Silicon Avalanche Suppression diode or a combination of SAS diodes. For example, an SAS configured to protect an alternating current (AC) based system may use one or more diodes in each direction of current flow.

When there is a transient voltage event, the voltage reaches an activation threshold level to cause the SAS to begin conducting using the avalanche effect and limit the transient voltage. If the transient voltage event exceeds a maximum threshold voltage or maximum threshold duration, VZ1 may become damaged and/or fuse F1 may blow causing LED2 to illuminate indicating that the suppression circuit 602 needs replacing and the protection circuit 600 is not providing protection.

Additionally, in an embodiment the suppression circuit 602 is also coupled to an audible alarm. For example, when VZ1 is damaged and allows power to pass through it, may also pass through diode D3 and through resistor R3 to regulator U1. Regulator U1 may pass a regulated voltage out to a timing circuit. For example, the timing circuit may include a dual timer chip, for example a 556 timer integrated circuit (IC) IC1 and may be configured to drive an audio signaling device SG1, for example a piezo electric audio transducer when the suppression circuit 602 is disabled.

Additionally, with respect to the function of a GFD and alarm system, in an embodiment the Ground may be passed though diode D4 to a junction between D3 and R3. Here, if there is a wiring discrepancy between the power source and the device configured to receive power, the audible alarm will also be triggered indicating a wiring issue. For example, a boat may be wired such that the boat is improperly grounded, for example, causing the water to be exposed to the Line or hot voltage. In this instance, the audible alarm system will trigger warning the user that the boat is improperly wired.

Additionally, in an embodiment the audible alarm may be silenced while wiring issue is corrected or the suppression circuit 602 is replaced depending on the underlying cause. For example, protection circuit 600 may include a switch S1 connected to the Neutral and configured to switch between the audio signaling device SG1 and an indicating circuit connected to the Line. In this case, if the audio signaling device SG1 is activated due to the underlying cause the switch S1 may disconnect the audio signaling device SG1 and engage the indicating circuit. Here, the indicating circuit may include rectifier D5, resistor R8, and an LED LED3. In this example, the audible alarm may be silenced while repairs are being made, however, the indicating circuit is then illuminated indicating that the underlying cause has not yet been resolved.

Table 1 shows illustrative values for components of an illustrative embodiment. Here, the listed values have been found to be satisfactory, although other values may be used. It should be understood that various other combinations of components can be used to perform the function of embodiments disclosed herein. Additionally, all of the components shown in FIG. 6 are available in commercial quantities and their individual functions are understood by those of skill in the art. As such, the individual operation of each of the components in FIG. 6 is not described in detail herein.

TABLE 1

Illustrative Component Values

C1 - Capacitor Aluminum
C2 - Capacitor Aluminum
C3 - Capacitor Aluminum
C4 - Capacitor Ceramic TABLE 1-continued Illustrative Component Values C5-C7 - Capacitor Ceramic
C8 - Capacitor Ceramic
D1-5 - Diode General purpose
D6 - Diode Zener
F1 - Fuse board mount or glass (slow blow)
IC1 - IC OSC Timer
LED1 - LED Green Clear
LED2 - LED Red Clear
LED3 - LED Orange Clear
R-R2 & R8 - Resistor
R3 - Resistor
R4 - Resistor
R5 - Resistor
R6 - Resistor
R7 - Resistor
SG1 - Audio Piezo Transducer
SW1 - Switch DPDT
U1 IC regulator LDO
VZ1 - Silicon Avalanche Suppressor (SAS)

Additionally, in an embodiment the SAS may be sized to effectively handle transients when connected to a specific type of power source. For example, the SAS may be sized to handle transients in a 120V system, a 240V system, etc. When seeking to suppress transients, in a power system using sinewave alternating voltage, it may be desirable to suppress transient overvoltages as close to the sinewave value as possible without causing the suppressor to be activated by regular variations in the power system's voltage levels.

Additionally, and/or alternatively, the size of the SAS may vary to improve protection over metal oxide varistors (MOVs). For example, in a given power system setting, the SAS may be sized to provide protection down to a lower protection threshold value than that which an MOV is capable. To be clear, MOVs are non-linear resistor devices designed to sense and limit transient voltages, where the resistance of the MOV decreases nonlinearly as voltage increases. However, the nonlinear relationship between resistance and voltage of the MOV is relatively slow in response when compared to the avalanching mechanism of the SAS. Thus, the SAS may have a response time to a transient voltage in the 1.0 nanosecond range, for example, while MOVs have a response time in the 50 nanosecond range. As such, the SAS is able to suppress a larger range of high-voltage transients and/or more of the initial portion of the transient. Accordingly, an SAS may suppress a transient that might otherwise damage a downstream device, since the voltage that passes the MOV before the MOV is able to react may still cause damage to the downstream device.

Moreover, MOVs inherently have a looser voltage protection tolerance band than SASs. For example, an MOV may have a tolerance band of 10-20% of the threshold activation voltage such that the MOV will begin to respond to a voltage 20% higher or 20% lower than the desired threshold activation voltage, where the SAS may have a tolerance band closer to 5% of the threshold activation voltage. As such, to ensure that the MOV isn't continually activated by the variability of the voltage supplied by the power source, the MOV threshold activation voltage must be set higher than the SAS. Thus, the SAS is able to suppress a larger range of high-voltage transients. For example, an SAS may suppress a transient that may still damage a downstream device despite the high-voltage transient not reaching a voltage high enough to which an MOV is able to detect and respond.

The following is provided as an example embodiment of the above. Metal Oxide Varistor (MOV) are tested to 1.2/50 μs voltages and 8/20 μs current wave forms per IEEE C62.1 Real world conditions are measured at 1/1000 μs voltages and 60/1000 μs current waveforms. In general, MOV's do not perform well as the real world wave forms as they degrade rapidly. The following data is based on a 20 mm diameter 5 KA MOV:

Response Time: 35-50 Nanoseconds
Voltage Protection Level (VPL): 300-600 volts

Furthermore, MOV's are voltage variable resistors meaning, as the current through the device increases, the resistance decreases proportionally to keep IR drop across the varistor constant. This does not happen in use for when the MOV conducts more current, the resistance will actually increase. If a transient would require a MOV will conduct 200 A for 20 μsec it would do this 10,000 times before possible failure. Alternatively, if the transient would require the MOV to conduct 200 A for 1000 μsec, the device would only conduct this once before failure.

In contrast, the following data is based on: 5 KA Silicone Avalanche Suppressor (SAS)

Response Time <5 Nanoseconds
Voltage Protection level (VPL) 200-300 volts

SAS device is a non-shortening device, meaning that it conducts only current contained in the transient above the voltage protection level. This allows for the continued operation of equipment while the transient is being dissipated. If a transient would require an SAS device to conduct 200 A for 20 μsec, the SAS device would accomplish this task unlimited number of times as long as the voltage did not increase above the failure level of the device. If a transient would require the SAS device to conduct 200 A for 1000 μsec, the device would likewise conduct this without failure as long as the voltage level was within the performance level of the device.

In comparison:
SAS (using a typical VZ20 5 k device 20 Vac)
 5000 W peak pulse power dissipation
 Voltage Breakdown (Vbr) 23.3V
 Limiting Voltage 32.4V
MOV (using 20 mm 5 k device 20 Vac)
 5000 W peak pulse power dissipation
 Voltage Breakdown (Vbr) 36.3V
 Limiting Voltage 65

Additionally, and/or alternatively, in an embodiment, TVS 200 may be configured to work with a 120V system using removable portion 216 with an appropriately sized SAS and may be reconfigured to work with a 240V system by either replacing the SAS in the removable portion 216 with an appropriately sized SAS for the 240V system or replacing the removable portion 216 with a second removable portion already containing the appropriately sized SAS for the 240V system. Furthermore, the TVS protection circuit can be placed into a larger or smaller housing in the same configuration as shown in TVS 100/200 to allow for additional applications for voltages and connection types.

Illustrative Processes and Techniques

Figure 7:
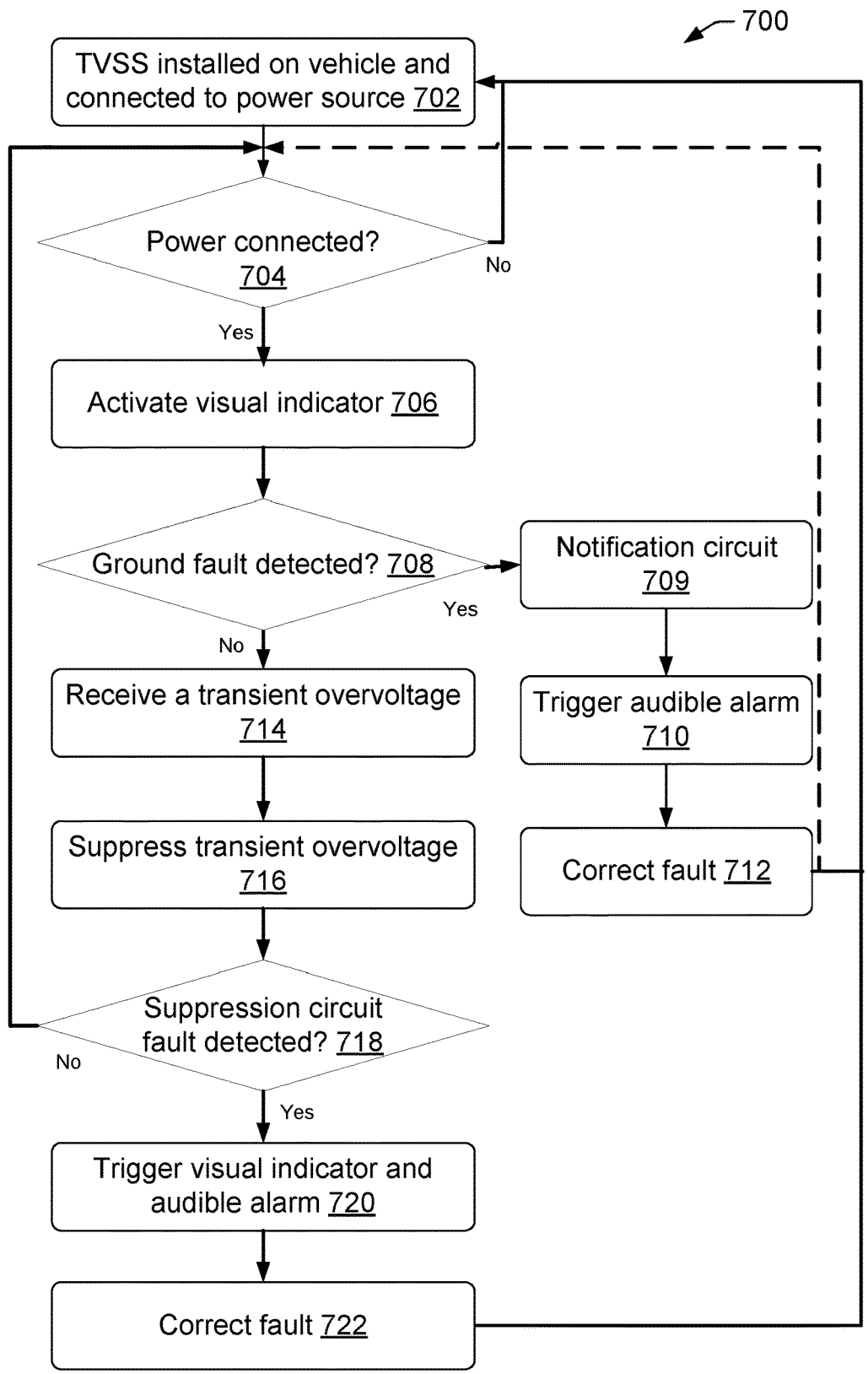
FIG. 7 shows an illustrative technique for operating systems to detect and react to transient voltages according to an embodiment of the instant disclosure.

FIG. 7 shows an illustrative process and technique 700 for operating an illustrative TVS of an embodiment that does not have status communication relaying capabilities. Any of the various TVS embodiments discussed throughout this disclosure may be used with this process and technique. Turning to FIG. 7, in an embodiment, at 702 the TVS is installed on (or connected to) a vehicle and may be connected to a power source. For example, the TVS may be installed into a power receptacle of the vehicle. Alternatively, the TVS may be installed on the power source first.

At 704, the TVS checks for power connected to the TVS. If determined in 704 that power is connected, at 706, a visual indicator may be activated to indicate that the TVS is connected to power. Conversely, if determined at 704 that power is not connected, then the TVS process returns to 702.

At 708, the TVS checks to detect a ground fault. If a ground fault is detected, then an audible alarm is triggered at 710. If the audible alarm is triggered, the audible alarm may be disengaged, for example, through a switch. In an embodiment, if the switch is used to disengage the audible alarm, a second visual indicator may trigger or the visual indicator activated in 706 may remain triggered and change colors to indicate the fault until the fault is corrected.

At 712, the fault is corrected and the TVS may be installed and connected to the power source at 702 or may remain installed and check for power at 704. In the event, an embodiment of a TVS is used that includes a removable suppression unit, from 712, the TVS skips 702 and proceeds to return to 704. In an embodiment, a switch on the TVS may be activated to reset the protection circuit and check again to detect a ground fault at 708.

If a ground fault is not detected, at 714, the TVS may receive a transient overvoltage as caused by one or more situations discussed herein above. Upon receipt of a transient overvoltage, at 716, the TVS suppresses the transient overvoltage. For example, the TVS may use an SAS to limit the transient overvoltage to a voltage level below a voltage level that may cause damage to a downstream device.

At 718, the TVS checks for a suppression circuit fault. If a suppression circuit fault is not detected, the TVS may return to 704.

If a suppression circuit fault is detected, a visual indicator and/or an audible alarm 710 may be triggered to indicate the fault at 720 via a notification circuit 709 included in the TVS. If the audible alarm is triggered, the audible alarm may be disengaged, for example, through a switch. In an embodiment, if the switch is used to disengage the audible alarm, a second visual indicator may commence, or the visual indicator activated in 706 may remain triggered and change colors to indicate the fault until the fault is corrected.

At 722, the fault is corrected. For example, the suppression circuit or a portion of the suppression circuit may be replaced to correct the fault. Once the fault is corrected, particularly for a TVS without a removable suppression unit, the system may be installed or connected to a power source at 702. Or, if the fault was corrected without detaching the TVS from the vehicle or power supply, then the TVS may check for a power source at 704.

Figure 8:
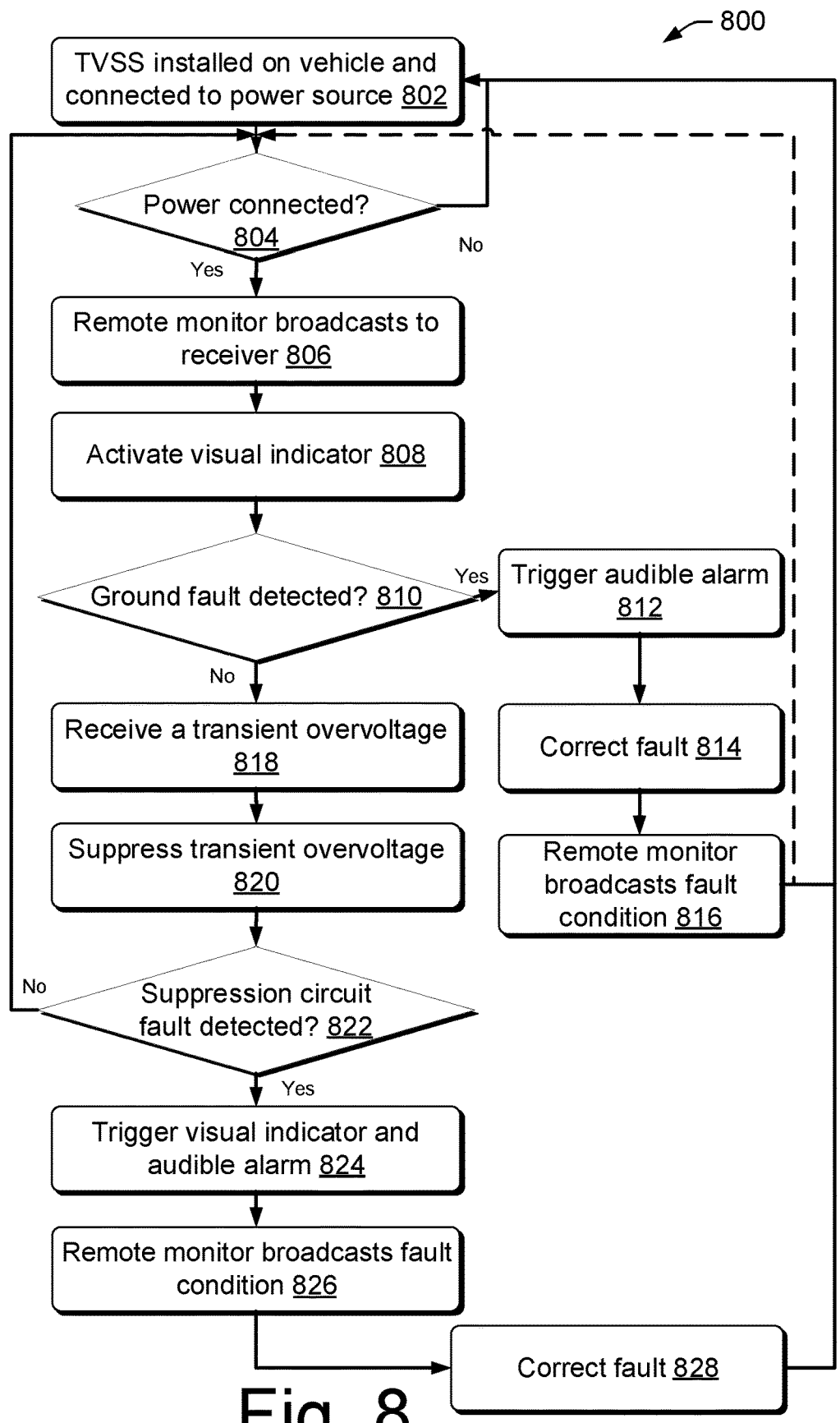
FIG. 8 shows another illustrative technique for operating systems to detect and react to transient voltages according to an embodiment of the instant disclosure.

FIG. 8 illustrates a process and technique 800 for operating an illustrative TVS of an embodiment that does have status communication relaying capabilities. As such, there are several similarities between FIG. 7 and FIG. 8, the differences between which will be discussed hereinbelow. Any of the various TVS embodiments discussed throughout this disclosure may be used with this process and technique. Turning to FIG. 8, in an embodiment, at 802 the TVS is installed on (or connected to) a vehicle and may be connected to a power source. For example, the TVS may be installed into a power receptacle of the vehicle. Alternatively, the TVS may be installed on the power source first.

At 804, the TVS checks for power connected to the TVS. If determined in 804 that power is connected, the communication circuit component (referred to as the "Remote Monitor" in FIG. 8) broadcasts the TVS status to a receiver (discussed above as a remote device in communication with the TVS to receive status updates) in 806. Conversely, if determined at 804 that power is not connected, then the TVS process returns to 802.

At 808 a visual indicator may be activated to indicate that the TVS is connected to power and functioning properly.

At 810, the TVS checks to detect a ground fault. If a ground fault is detected, then an audible alarm is triggered at 812. If the audible alarm is triggered, the audible alarm may be disengaged, for example, through a switch. In an embodiment, if the switch is used to disengage the audible alarm, a second visual indicator may trigger or the visual indicator activated in 808 may remain triggered and change colors to indicate the fault until the fault is corrected.

At 814, the fault is corrected and at 816, the Remote Monitor broadcasts the fault condition. The TVS may be installed and connected to the power source at 802 or may remain installed and check for power at 804. In the event, an embodiment of a TVS is used that includes a removable suppression unit, from 816, the TVS skips 802 and proceeds to return to 804. In an embodiment, a switch on the TVS may be activated to reset the protection circuit and check again to detect a ground fault at 810.

If a ground fault is not detected, at 818, the TVS may receive a transient overvoltage as caused by one or more situations discussed herein above. Upon receipt of a transient overvoltage, at 820, the TVS suppresses the transient overvoltage. For example, the TVS may use an SAS to limit the transient overvoltage to a voltage level below a voltage level that may cause damage to a downstream device.

At 822, the TVS checks for a suppression circuit fault. If a suppression circuit fault is not detected, the TVS may return to 804.

If a suppression circuit fault is detected, a visual indicator and/or an audible alarm may be triggered to indicate the fault at 824 via a notification circuit included in the TVS. If the audible alarm is triggered, the audible alarm may be disengaged, for example, through a switch. In an embodiment, if the switch is used to disengage the audible alarm, a second visual indicator may commence, or the visual indicator activated in 808 may remain triggered and change colors to indicate the fault until the fault is corrected.

At 826, the Remote Monitor broadcasts the fault condition.

At 828, the fault is corrected. For example, the suppression circuit or a portion of the suppression circuit may be replaced to correct the fault. Once the fault is corrected, particularly for a TVS without a removable suppression unit, the system may be installed or connected to a power source at 802. Or, if the fault was corrected without detaching the TVS from the vehicle or power supply, then the TVS may check for a power source at 804.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments. Any portion of one embodiment may be used in combination with any portion of a second embodiment.

What is claimed is:

1. A transient voltage suppressor ("TVS") device configured to be installed in a vehicle, the TVS device comprising:
a housing having a first end and an opposing second end;

three prongs extending from the first end of the housing to electrically connect to a receptacle of an alternating current ("AC") power source;
three recessed contacts extending into the second end, the three recessed contacts configured to respectively receive correspondingly shaped conductor prongs from a power connector, the three recessed contacts and the three prongs configured to pass electrical power along a ground wire, a neutral wire, and line wire, respectively;
a protection circuit disposed within the housing and in electrical communication with the three prongs and the three recessed contacts, the protection circuit including at least one silicon avalanche suppression diode ("SAS diode") to limit high transient voltage to a lower voltage level; and
a communication circuit disposed within the housing and in electrical communication with the protection circuit, the communication circuit to communicate a status of the vehicle, the status including one or more of:
a correct connection of wiring of the vehicle with respect to the AC power source,
an incorrect connection of the wiring of the vehicle with respect to the AC power source, or
a fault,
wherein the protection circuit includes a first removable portion containing the SAS diode therein, the first removable portion being:
adapted to disconnect from the TVS device without the TVS device requiring disconnection from one or more of the AC power source or the power connector, and
replaceable with a second removable portion reenabling protection.

2. The TVS device of claim 1, wherein the power connector is affixed to one or more of: a power cord, a boat, a recreation vehicle, or an aircraft.

3. The TVS device of claim 1, wherein the communication circuit includes an audio alarm electrically connected to the protection circuit indicating an alarm status of the device.

4. The TVS device of claim 1, wherein the communication circuit includes one or more visual indicators electrically connected to the protection circuit indicating the status of the TVS device.

5. The TVS device of claim 1, wherein the protection circuit is adapted to limit high transient voltage above starting at 20% above a peak sign wave with protection levels not to exceed 550V peak, with a peak current value of 1.5 KA to 20 KA.

6. A method to suppress a transient voltage, the method comprising:
connecting a transient voltage suppressor (TVS) device to a power source, the TVS device connected to a vehicle and the TVS includes at least one silicon avalanche suppressor ("SAS") and a protection circuit, the protection circuit including:
a first removable portion containing the SAS diode therein, the first removable portion being:
adapted to disconnect from the TVS device without the TVS device requiring disconnection from one or more of the AC power source or a power connector, and
replaceable with a second removable portion reenabling protection;
determining when a transient voltage has been received; and
in response to receiving the transient voltage:
suppressing the transient voltage, and
triggering, based on a determination of a fault in the protection circuit of the TVS, at least one of an audible alarm or a visual indicator to indicate the fault in the protection circuit.

7. The method of claim 6, wherein the suppressing the transient voltage includes suppressing the transient voltage to a level sufficient to protect a downstream electrical device.

8. The method of claim 6, wherein the method further comprises:
triggering, based on a determination of the fault in a grounding of the vehicle, at least one of: an audible alarm or a visual indicator, to indicate the fault in the grounding of the vehicle.

9. The method of claim 8, wherein when the audible alarm is triggered, the method further comprises:
receiving an indication to disable the audible alarm, and
disabling the audible alarm and enabling a fault visual indicator indicating the fault.

10. A transient voltage suppressor ("TVS") device comprising:
a housing including:
a first end adapted to electrically connect to a receptacle of a power source, and
a second end adapted to receive a conductor from a power connector; and
circuitry including:
a protection circuit in electrical communication with the first end and the second end of the housing, the protection circuit including at least one silicon avalanche suppression diode ("SAS diode") to limit high transient voltage to a lower voltage level, and
a communication circuit in electrical communication with the protection circuit, such that, upon connecting the TVS device to a vehicle, the communication circuit to communicate a status of the TVS device, the status including one or more of:
a correct connection of wiring of the vehicle with respect to the power source,
an incorrect connection of the wiring of the vehicle with respect to the power source, or
a fault,
wherein the protection circuit includes a first removable portion containing the SAS diode therein, the first removable portion being:
adapted to disconnect from the TVS device without the TVS device requiring disconnection from one or more of the AC power source or the power connector, and
replaceable with a second removable portion reenabling protection.

11. The TVS device according to claim 10, wherein the communication circuit is configured to send the status of the TVS device wirelessly to a remote secondary device.

12. The TVS device according to claim 10, wherein the communication circuit is configured to be linked to a plurality of TVS devices, and
wherein each of the TVS devices, respectively, includes a unique identifier that indicates at least one of a location, the device, or the vehicle upon connection to the vehicle.

13. The TVS device according to claim 10, wherein the communication circuit includes a TVS failure alarm with support Modbus TCP and Modbus RTU over TCP for remote network monitoring.

14. The TVS device according to claim 10, wherein the communication circuit includes a Modbus.

15. The TVS device according to claim 10, wherein the housing is waterproof.

16. The TVS device according to claim 10, wherein the first removable portion is a lockable section that is removable from the housing.

17. The TVS device according to claim 16, wherein the lockable section supports a suppression circuit board.

18. The TVS device according to claim 10, wherein the circuitry includes a disengageable suppression circuit board.

* * * * *